United States Patent [19]
Major et al.

[11] Patent Number: 5,150,975
[45] Date of Patent: Sep. 29, 1992

[54] COMPACT SELF-LUBRICATING BEARING SYSTEM

[75] Inventors: Kenneth E. Major; John L. Baker; David K. Braunagel, all of Houston, Tex.

[73] Assignees: Hy-Tech Hydraulics, Inc.; Michael P. Breston, both of Houston, Tex.

[21] Appl. No.: 14,425

[22] Filed: Feb. 12, 1987

[51] Int. Cl.⁵ .............................................. F16C 33/66
[52] U.S. Cl. .................................. 384/465; 384/468; 384/471; 384/472; 384/473
[58] Field of Search ............... 384/465, 468, 471, 472, 384/473, 404

[56] References Cited

U.S. PATENT DOCUMENTS

| | | | |
|---|---|---|---|
| 1,992,818 | 2/1935 | Else | 384/468 |
| 2,212,223 | 8/1940 | Barnes | 384/465 |
| 2,447,671 | 8/1948 | Schuck | 384/468 |
| 2,635,548 | 4/1953 | Brawley | 103/115 |
| 2,849,262 | 8/1958 | Wood et al. | 384/468 |
| 2,950,943 | 8/1960 | Forrest | 384/468 |
| 4,241,959 | 12/1980 | Frister | |
| 4,541,784 | 9/1985 | Hörler | 417/407 |

FOREIGN PATENT DOCUMENTS

| | | |
|---|---|---|
| 631886 | 5/1963 | Belgium . |
| 579061 | 4/1931 | Fed. Rep. of Germany . |
| 836131 | 4/1952 | Fed. Rep. of Germany . |
| 1139705 | 11/1962 | Fed. Rep. of Germany . |
| 316581 | 8/1902 | France . |
| 451714 | 5/1968 | Switzerland . |
| 2084652 | 4/1982 | United Kingdom . |

OTHER PUBLICATIONS

European Search Report Jun. 10, 1987 in Ser. No. EP 87 30 0230.

*Primary Examiner*—Lenard A. Footland
*Attorney, Agent, or Firm*—Michael P. Breston

[57] ABSTRACT

The bearing lubricating system comprises a casing having a bore which defines a reservoir and a well sized to receive a sufficient volume of a suitable liquid lubricant. A return passage in the casing allows fluid flow from the well to the reservoir. A shaft extends through the reservoir and through the well. At least one bearing is situated in the bore between the reservoir and the well. A pumper element is mounted on the shaft for rotation therewith within the well. A pair of end seals seal off the opposite ends of the bore from the ambient.

18 Claims, 3 Drawing Sheets

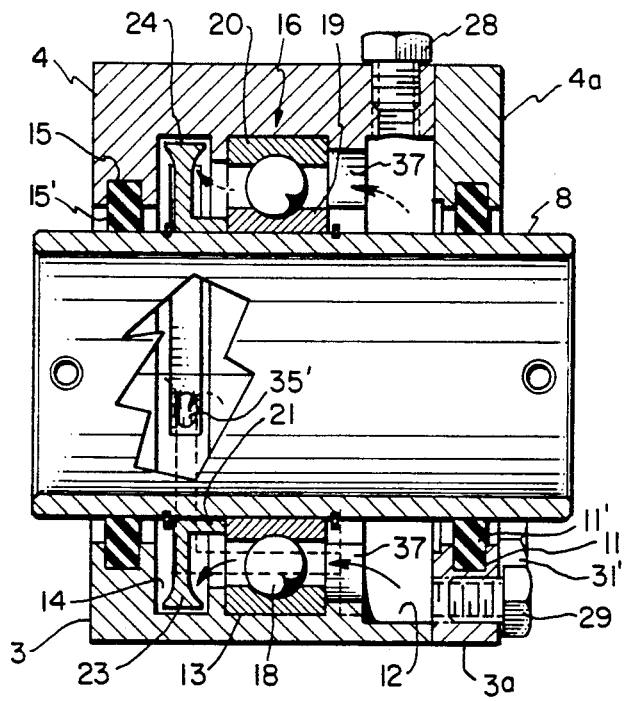
Fig. 4
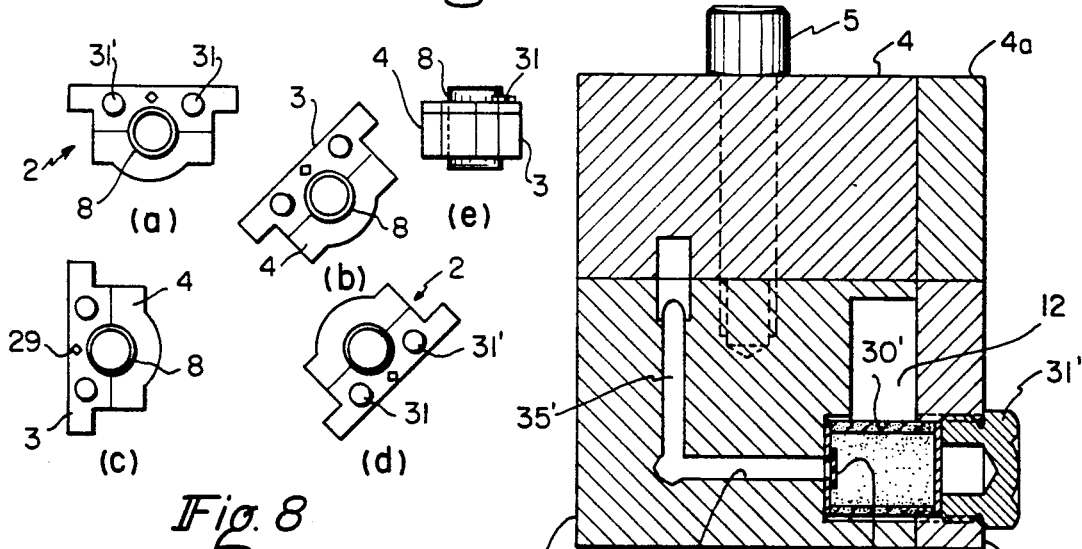
Fig. 8
Fig. 5
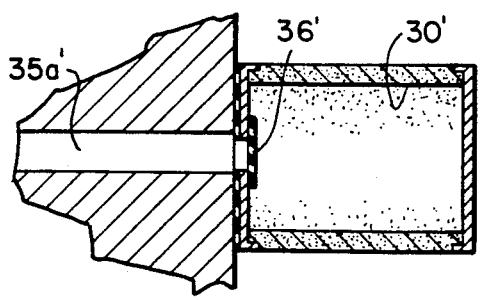
Fig. 6
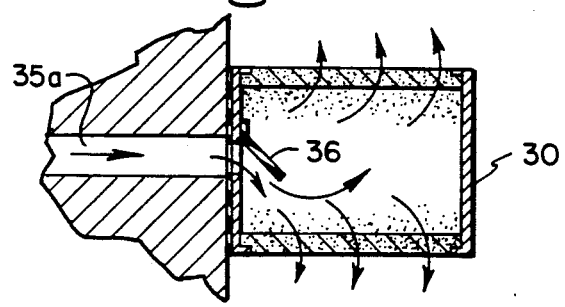
Fig. 7

5,150,975

COMPACT SELF-LUBRICATING BEARING SYSTEM

BACKGROUND OF THE INVENTION

1. Field of the Invention

This invention generally relates to self-lubricating bearings and, more particularly, to a continuously self-lubricating and self-cleansing, non-friction compact bearing which supports a rotatable shaft such as a sleeve shaft.

2. Description of the Prior Art

Shaft-support, non-friction bearings are characterized by an inner race, an outer race, and non-friction bearing elements that rotate between the races.

There has been a long-felt need for a self-lubricating and self-cleansing, non-friction shaft support bearing system that is neither complicated to use, nor expensive to install, and that can fit within substantially the same space occupied by a conventional shaft-support bearing on existing machines.

Known oil lubrication systems are inadequate for such non-friction bearings that support horizontal shafts, and they are even worse for such bearings which support vertical shafts.

At low-to-medium shaft speeds, turbulence in the oil keeps the rotating bearings covered with a film of oil, but at higher speeds centrifugal forces tend to remove this oil film leaving damaging metal-to-metal contact.

Known is an oil mist lubricating system which utilizes a source of regulated compressed air, an oil reservoir, a mist generator, a mist-to-oil condenser, a nozzle to force the condensed oil jet into the bearing, and a pump for returning the oil from the bearing back to the oil reservoir. Obviously, such a mist system is bulky, impractical and too expensive for use with most portable machines such as concrete saws and the like. Oil when delivered to a bearing under pressure increases friction in the bearing which tends to reduce its operational life.

A mist system which does not require a source of compressed air is described in U.S. Pat. No. 2,950,943. It uses an oil reservoir situated below a slinger arm that is coupled to the rotatable shaft. The slinger splashes oil and creates a mist some of which is intended to reach the rotating bearing surfaces. This mist provides irregular and non-uniform lubrication and, even at best, does not sufficiently lubricate nor cleanse off the wear products from the bearings.

Most of the above and other well-known problems associated with self-lubricating bearings have been solved by the invention described in applicants' co-pending application Ser. No. 06/818,503 filed on Jan. 13, 1986, assigned to the same assignee. This application is incorporated herein by reference.

The present invention solves a difficult problem and differs from that described in said co-pending application primarily in that the present self-lubricating bearing requires a minimum of space and therefore is superbly suitable to replace conventional shaft-support, non-friction bearings within the cramped spaces allocated for them on existing machines. In this manner, existing machines can be retrofitted with the present self-lubricating bearings without any modifications required to be made to the machines.

SUMMARY OF THE INVENTION

The lubricating system of this invention comprises a casing having a bore which defines a reservoir and a well. The reservoir is sized to receive a sufficient volume of a suitable liquid lubricant, such as oil. A return passage in the casing allows fluid flow from the well to the reservoir. A shaft extends through the reservoir and through the well. At least one bearing is situated in the bore between the reservoir and the well. The bearing has an inner race, an outer race, and bearing elements between the races. The bearing supports the shaft for rotation within the bore. A pumper element is mounted on the shaft for rotation therewith within the well. The opposite ends of the bore are sealed off from the ambient by a pair of seals. In use, the rotating pumper element causes lubricant to flow by suction out of the reservoir through and across the bearing and thence into the well, thereby lubricating and cleansing the bearing surfaces. The lubricant flows out by pressure from the well back to the reservoir through the return passage and preferably also through a filter.

BRIEF DESCRIPTION OF THE DRAWINGS

FIGS. 4 and 5 are sectional views taken on lines 4—4 and 5—5 of FIG. 2, respectively;

FIG. 6 is an enlarged sectional view of the filter shown in FIG. 5 and of its associated valve in its closed position when the shaft is rotating in a clockwise direction;

FIG. 7 is an enlarged sectional view of the filter and of its associated open valve which is associated with the return passage carrying pressurized lubricant when the shaft is rotating in a counter-clockwise direction;

FIGS. 8(a)–(d) are schematic views of the system of FIG. 1 illustrating various mounting positions which the system can assume; and FIG. 8(e) schematically illustrates the use of the novel system for supporting a vertical shaft.

DETAILED DESCRIPTION OF A PREFERRED EMBODIMENT

Figure 1:
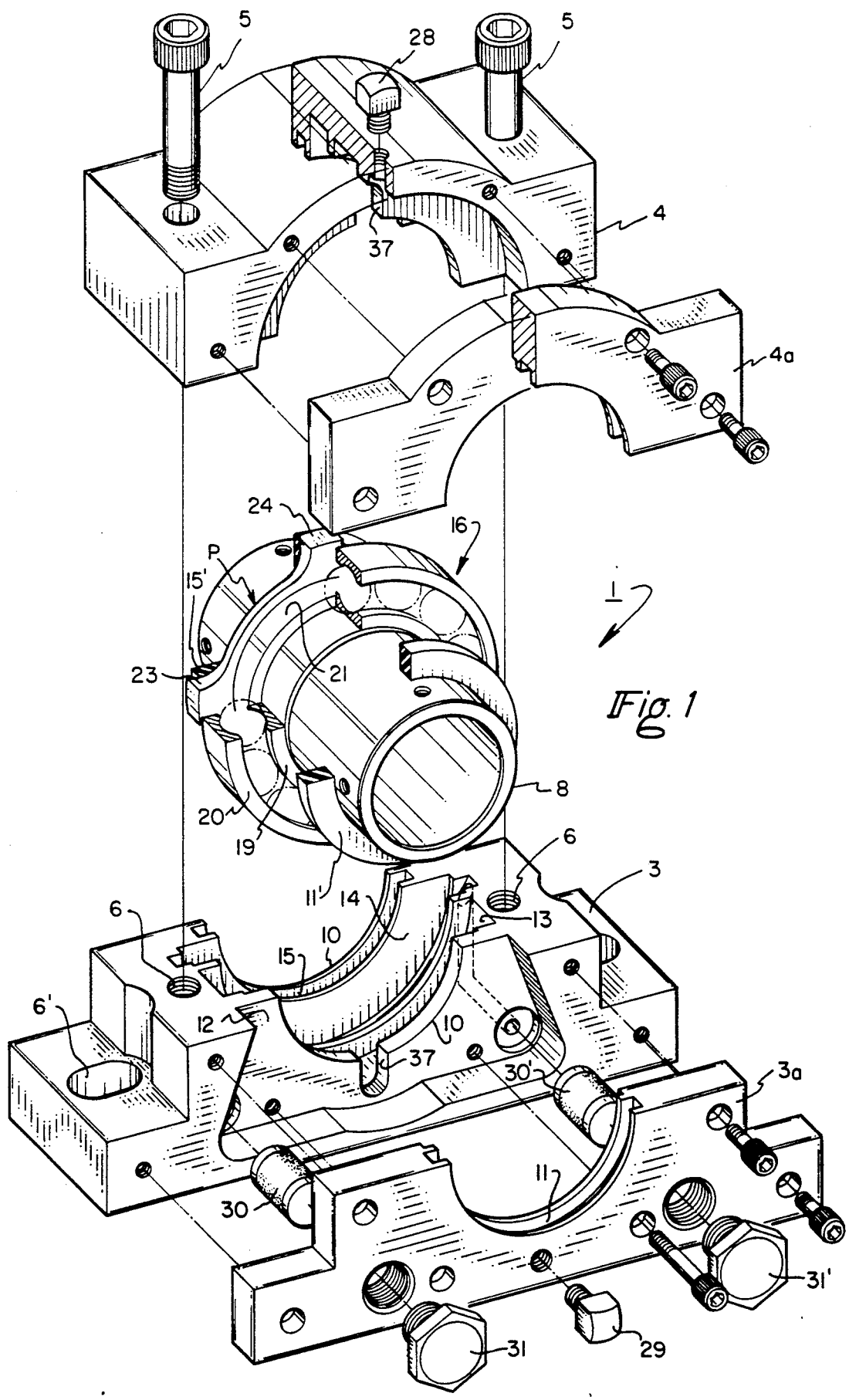
FIG. 1 is an exploded view, partly in section, of the novel lubricating system illustrated as being for a bi-directional horizontal shaft supported by a non-friction bearing.

In the drawings, similar or symmetrical parts will sometimes be designated with the same reference characters followed by a prime (') and such parts will not be described to avoid repetition.

The invention can be used with uni-directional or bi-directional sleeve shafts either horizontal or vertical which are required to be supported by one or more bearings, as more fully described in said co-pending patent application.

The present invention is illustrated in connection with a preferred embodiment of a bi-directional, self-lubricating bearing system, generally designated as 1 (FIG. 1), having a split casing 2. Casing 2 can be constructed from a base portion 3, a front plate 3a, a cover portion 4, and a cover plate 4a, all of which are held together by bolts 5 extending through holes 6. On the other hand, casing 2 can be a split casting using a suitable metal.

Casing 1 has a main bore 7 (FIG. 3) for housing a rotatable sleeve shaft 8. Main bore 7 has a wall 9 from which extend inwardly a plurality of parallel annular shoulders 10 (FIG. 1) of different widths. Within the inner cylindrical walls of some of shoulders 10 are defined grooves while some shoulders 10 are used as retaining walls for lubricant and for the bearing, as will be subsequently described.

Thus bore 7 has at one end thereof an annular seal groove 11 which is followed by an oil reservoir 12, an annular bearing groove 13, an annular oil well 14, and a seal groove 15.

Shaft 8 extends through reservoir 12, bearing 16, and well 14. It was discovered that when reservoir 12 completely wraps around the shaft, the external dimensions of casing 2 can be a minimum for a needed lubricant volume in reservoir 12, which is a very important and unobvious aspect of the present invention.

Figure 2:
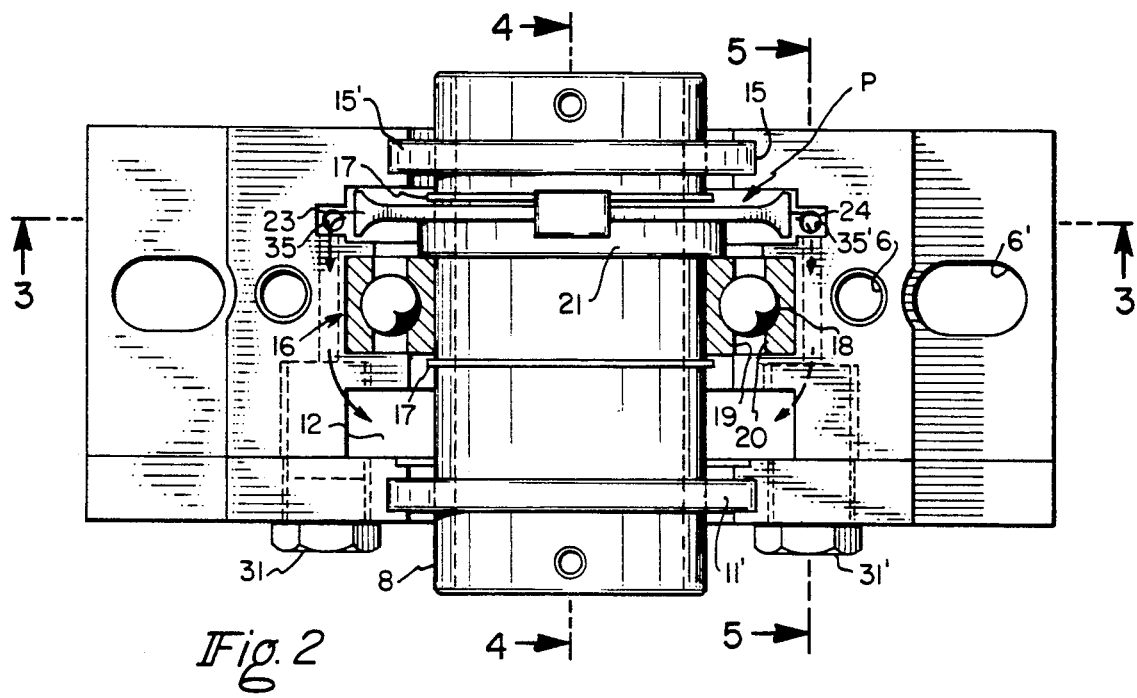
FIG. 2 is a top view of the lubricating system of FIG. 1 but with the casing's cover removed.

Sleeve shaft 8 (FIG. 2) is supported for rotation by a bearing 16 having suitable bearing elements such as balls 18 contained within a cage (not shown). Balls 18 rotate between an inner race 19 which rotates with shaft 8 and a stationary outer race 20 which snugly fits within groove 13. The inner race 19 is retained on shaft 8 by a pair of snap rings 17. As is well known, the inner race can be stationary and the outer race rotatable.

Reservoir 12 is on one side of bearing 16 and well 14 is situated on the other side of bearing 16. The annular shoulder 10 which separates reservoir 12 from bearing groove 13 preferably has a width sufficient to cover balls 18 except for a passage between reservoir 12 and groove 13, as subsequently described. The annular shoulder 10 which separates bearing groove 13 from well 14 has a narrower width than that of shoulder 10 which separates bearing groove 13 from reservoir 12.

Within oil well 14 rotates a circular pumper element, generally designated as P, that is concentrically secured to shaft 8. Pumper element P can have different configurations for different lubrication requirements of bearing 16, as more fully described in said co-pending application.

In the preferred embodiment, pumper element P has an outer diameter which corresponds to the diameter of outer race 20. Pumper element P includes an annular hub 21 (FIGS. 1-3) from which extend four radial vanes, generally designated as 22.

The number and shape of vanes 22 will depend mostly on the speed and lubrication requirements of bearing 16. For higher speeds, two vanes 22 could be sufficient, while eight or more such vanes can be used for lower speeds.

Each vane 22 has an outwardly-flared end 23 having a peripheral arcuate rim 24 between opposite sides 25,26. Each pair of consecutive vanes 22 defines a pocket 27 therebetween.

Reservoir 12 is of sufficient size to maintain an adequate volume of a suitable oil. Oil can be added to reservoir 12 through a fill plug 28 to meet the lubrication needs of system 1. The needed oil volume is inversely proportional to the speed of shaft 8. Either too much or not enough oil in reservoir 12 may result in a shortened bearing life. The oil can be drained through a drain plug 29 which can include a magnet (not shown) to attract metal particles. In a machine which requires that base 3 be attached in a position which is 180° from that shown in FIG. 3, the roles of plugs 28 and 29 are reversed. The oil circulating through reservoir 12 is cleaned by a pair of filter elements 30,30' which can be inserted through filter caps 31,31', respectively.

Figure 3:
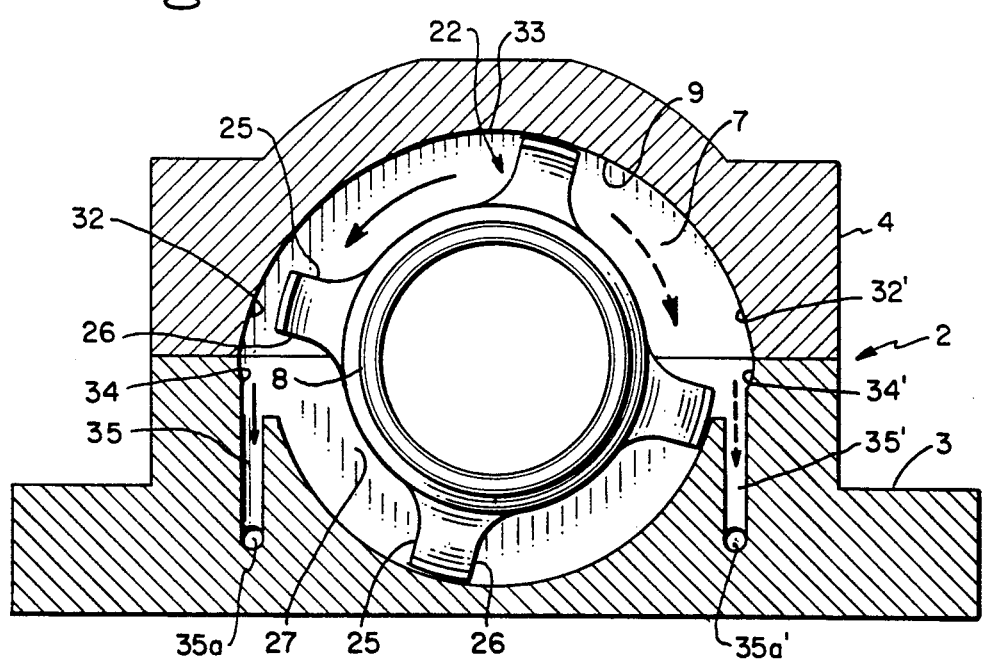
FIG. 3 is a sectional view taken on line 3—3 of FIG. 2.

For a bi-directional shaft 8, oil well 14 has a pair of diametrically-opposed and oppositely-directed, arcuate, eccentric expander channels 32,32' (FIG. 3). Each off-center expander channel extends into wall 9 of bore 7 from a point 33 and gradually shifts circumferentially and outwardly off-center over an arcuate extent up to a discharge outlet 34. Expander channels 32,32' are identical and of equal angular length, preferably between 30° and 90°.

Discharge outlet 34 (FIGS. 3-7) is coupled to and smoothly merges with an an L-shaped oil return passage having a vertical leg 35 and a horizontal leg 35a, as viewed in FIGS. 3-5.

Return passage 35a communicates with filter 30 through a uni-directional valve 36. Return passage 35a' communicates with filter 30' through a uni-directional valve 36'.

Reservoir 12 communicates with bearing groove 13 and well 14 through an inlet passage 37 which is within the annular shoulder 10 that separates reservoir 12 from bearing groove 13.

Grooves 11,15 accept annular double-lip seals 11',15', respectively, which are concentrically mounted on shaft 8 for effectively sealing bearing 16 against the environment and for containing the oil within main bore 7.

To better understand the operation of system 1, the direction of rotation of shaft 8 and of the oil flow are indicated in the drawings by solid arrows. The dotted arrows assume a reversal of shaft rotation and of oil flow.

When shaft 8 is not rotating, the filtered oil flows out by gravity from reservoir 12 through inlet passage 37 into bearing groove 13 and from there into well 14. Oil collects at the bottom of well 14 and around the lowermost balls 18 until the oil levels in well 14 and in reservoir 12 equalize. The oil level should be sufficient to barely cover the lowermost balls 18.

When shaft 8 rotates counter-clockwise (FIG. 3), oil is discharged under pressure at outlet 34 into return passage 35. The oil pressure in return passage 35 opens valve 36 (FIG. 7). Valve 36' remains closed (FIG. 6). Oil flows from well 14 into return passage 35 and then flows into reservoir 12 through uni-directional valve 36 and filter element 30. The clean oil flows out from reservoir 12 through inlet passage 37 and returns into well 14.

Conversely, when shaft 8 rotates clockwise, oil pressure in return passage 35' opens valve 36'. Valve 36 remains closed. Oil flows from well 14 into return passage 35' and then flows into reservoir 12 through uni-directional valve 36' and filter element 30'. Again, the filtered oil flows out from reservoir 12 through inlet passage 37 and returns into well 14.

More specifically, when shaft 8 and pumper element P rotate counterclockwise, the oil in well 14 starts to rotate under the influence of pumper element P. The pressure starts rising when the oil is forced to enter into the reduced area of eccentric expander channel 32.

Each vane 22 centrifugally injects a portion of the oil from well 14 into expander channel 32, while some of the rotating oil is trapped within pockets 27 between vanes 22.

The oil acquires kinetic energy within expander channel 32 from which it flows out under pressure through discharge outlet 34 into return passage 35.

Valves 36,36' remain open or closed and therefore filters 30,30' will receive lubricant from return passages 35a,35a' depending on the direction of the shaft's rotation. Thus, each uni-directional valve allows lubricant to flow into the reservoir only from the return passage which receives pressurized lubricant from well 14.

When shaft 8 rotates counter-clockwise at a constant speed, oil from reservoir 12 is sucked out by the rotating pumper element P and is fed through and across bearing 16 also at a constant rate. The velocity of the oil at discharge outlet 34 must be sufficiently high so as to maintain an adequate oil flow in a generally axial direction through and across balls 18 and between races 19 and 20 (FIG. 4) and, in so doing, cleansing and lubricating bearing 16.

Because the lubricant oil is sucked into and across bearing 16, the lubricant does not add to the friction in the bearing, which is a very important aspect of system 1. If the oil were injected into the bearing under pressure, the consequential friction in the bearing might cause it to overheat.

The velocity of the oil flowing through off-center expander channel 32 varies depending on the size and shape of vanes 22, on the arcuate length and eccentricity of expander channel 32, on the speed of shaft 8, and on the dimensions in and around discharge outlet 34.

Accordingly, the velocity of the oil in expander channel 32 can be controlled by changing the eccentricity of expander channel 32, by modifying the design of vanes 22, by altering the critical dimensions in and around outlet 34, and/or by changing the spacing between the peripheral edge 24 of pumper element P and wall 9 of well 14.

Interchangeable pumper elements P can be provided having different geometrical configurations. They can be conveniently used to vary in the field the rate of oil flow in expander channel 32, which is another important advantage of lubricating system 1.

In FIGS. 1-7, base 3 is shown as being at the bottom. An important advantage of system 1 is that it will continue to operate properly even when base 3 is rotated up to 180° from its position shown in FIG. 1. Various positions of system 1 relative to the horizontal are illustrated in FIGS. 8(a)-8(d).

Additionally, case 2 can be mounted so that shaft 8 will be supported by bearing 16 for rotation in a vertical direction, as can be seen from FIG. 8(e). The preferred position for the casing 2 and its shaft 8 are such that pumper element P should lie under bearing 16 and reservoir 12 will therefore be situated above bearing 16.

In that position, the sectional view of system 1 can be visualized considering FIG. 4 being rotated counter-clockwise 90° from the position shown in the attached drawings. When shaft 8 is not rotating, oil drains by gravity from reservoir 12 through bearing groove 13 into well 14 to provide oil for pumper element to operate upon.

As shaft 8 in FIG. 8(e) starts to rotate, oil will return to reservoir 12 and then oil circulation will take place through and across bearing 16.

The present self-lubricating bearing system requires a minimum of space and can be used to replace conventional shaft-support, non-friction bearings within the cramped spaces allocated for them on existing machines. In this manner, existing machines can be retrofitted with the present self lubricating bearings without any modifications thereto.

For example, base 3 can be anchored to a support in a concrete cutting machine (not shown) by bolts extending through mounting holes 6'. Base 3 is shaped so that it can be bolted in the same space as that occupied by the conventional bearing housing which it replaces. In this manner, the same associated parts, such as drive belts, etc., can be utilized with the novel system 1.

It will be appreciated that the self-lubricating bearing system 1 of the invention is simple in construction and economical to manufacture. A film of clean oil is continuously maintained on balls 18, and moisture and foreign matter are prevented from being sucked into cavity 7. Oil is pulled into and out of bearing 16 by suction, and friction is kept to a minimum between the bearing surfaces, thereby increasing their operational life.

What is claimed is:

1. A bearing lubricating system, comprising:
    a casing having a body defining a bore, a liquid lubricant reservoir, a circular well, and a return passage between said well and said reservoir;
    said well having at least one expanding channel gradually tapering outwardly over an arcuate extent;
    said channel having a discharge outlet communicating with said return passage;
    a shaft extending through said reservoir and through said well;
    at least one bearing between said reservoir and said well, said bearing having an inner race, an outer race, and bearing elements between said races for supporting said shaft for rotation within said bore;
    a circular pumping mechanism concentrically mounted on said shaft for rotation within said well, said pumping mechanism having (1) an overall diameter corresponding substantially to the outside diameter of said outer race, and (2) at least two diametrically-opposed radial vanes, and each consecutive pair of vanes defining a pocket therebetween for accepting lubricant therein, whereby said pumping mechanism, when rotating with said shaft, (1) causing lubricant to flow by suction out of said reservoir through and across said bearing and into said well, thereby lubricating and cleansing said bearing elements, and (2) pressurizing said lubricant to flow out of said well and return to said reservoir through said discharge outlet and said return passage; and
    a pair of end seals at the opposite ends of said bore for sealing off said bore from the ambient.

2. A bearing lubricating system according to claim 1, and further comprising:
    a filter element for filtering said returning lubricant flowing from said return passage back into said reservoir.

3. A bearing lubricant system according to claim 2, and further including:
    an annular shoulder in said bore between said bearing and said reservoir, and said shoulder having an inlet passage; and
    said pumping mechanism when rotating with said shaft causing lubricant to flow by suction out of said reservoir through said inlet passage, thence through and across said bearing and into said well.

4. An apparatus for controllably circulating liquid lubricant through a bearing supporting a rotating shaft, comprising:
    a pressure pump mounted on said shaft adjacent to said bearing and being powered by said shaft to create a pumping action, said pump having a discharge outlet in fluid communication through a return channel with one side of said bearing, said return channel including a liquid lubricant reservoir and a filter coupled between said discharge outlet of said pump and said reservoir, whereby when said shaft is rotating, liquid lubricant flows from said discharge outlet through said return channel including said filter and said reservoir, through one side of said bearing and across said bearing, through the opposite side of said bearing, and returns back to said pump, thereby completing on full cycle of liquid lubricant flow; and said pump raising the pressure of said liquid lubricant flowing therethrough by an amount sufficient to maintain adequate liquid lubricant flow across said return channel and to maintain sufficient suction across said bearing, thereby continuously and effectively recycling said lubricant through and across said bearing and lubricating and cleansing the surfaces of said bearing.

5. A bearing lubricating system, comprising:

a casing having a body defining a bore, a liquid lubricant reservoir, a circular well, and a return passage between said well and said reservoir;

said well having at least one expanding channel gradually tapering outwardly over an arcuate extent;

said channel having a discharge outlet communicating with said return passage;

a shaft extending through said reservoir and through said well;

at least one bearing between said reservoir and said well, said bearing having an inner race, an outer race, and bearing elements between said races for supporting said shaft for rotation within said bore;

an annular shoulder in said bore between said bearing and said reservoir, and said shoulder having an inlet passage;

a pumping mechanism mounted on said shaft for rotation therewith within said well, whereby said pumping mechanism, when rotating with said shaft, causing lubricant to flow by suction out of said reservoir through said inlet passage, thence through and across said bearing and into said well, thereby lubricating and cleansing said bearing elements, and causing said lubricant to flow by pressure out of said well and return to said reservoir through said discharge outlet and said return passage;

a filter element for filtering said returning lubricant to said reservoir; and a pair of end seals sealing off the opposite ends of said bore from the ambient.

6. A bearing lubricating system, comprising:

a casing having a body defining a bore, a liquid lubricant reservoir, a circular well, and first and second return passages between said well and said reservoir;

said well having a pair of opposed expanding channels, each channel gradually tapering outwardly over an arcuate extent in a direction opposite from the other tapered channel, and each channel having a discharge outlet;

one of said discharge outlets communicating with said first return passage, and said other discharge outlet communicating with said second return passage;

a shaft extending through said reservoir and through said well;

at least one bearing between said reservoir and said well, said bearing having an inner race, an outer race, and bearing elements between said races for supporting said shaft for rotation within said bore;

a pumping mechanism mounted on said shaft for rotation therewith within said well; and a pair of end seals sealing off the opposite ends of said bore from the ambient.

7. A lubricating system according to claim 6, and a pair of filter elements in said reservoir, each filter element being adapted to receive lubricant from its associated return passage depending on the direction of shaft rotation.

8. A bearing lubricating system according to claim 7, and a uni-directional valve between each return passage and its associated filter element.

9. An apparatus for supporting a rotating shaft, comprising:

a bearing for supporting said rotating shaft, said bearing having an inlet side and an outlet side;

a rotary liquid pumping mechanism concentrically mounted on said shaft adjacent to said outlet side of said bearing for rotation with said shaft;

a casing having a body (1) defining a return flow channel externally of said bearing, (2) having an inner wall enclosing said bearing and surrounding said pumping mechanism with a defined clearance to form therebetween a defined pumping chamber having a discharge outlet, (3) sealingly receiving said rotating shaft, and (4) for containing a predetermined volume of liquid lubricant; and said pumping mechanism, when rotating, discharging a volume of liquid lubricant at a higher pressure compared to the atmospheric pressure of the liquid lubricant at the inlet side of said bearing, and said discharged liquid lubricant flowing from said pumping chamber through said discharge outlet, said return channel, said inlet side of said bearing, said bearing, said outlet side of said bearing, and returning back to said pumping chamber, thereby controllably maintaining continuous liquid lubricant flow through said bearing.

10. An apparatus for supporting a rotating shaft according to claim 9, wherein said pumping mechanism is substantially circular in form and has an overall diameter corresponding substantially to the outside diameter of said bearing.

11. An apparatus for supporting a rotating shaft, comprising:

a bearing for supporting said rotating shaft, said bearing having an inlet side and an outlet side;

a rotary liquid pumping mechanism concentrically mounted on said shaft adjacent to said outlet side of said bearing for rotation with said shaft;

a casing having a body (1) defining a return flow channel externally of said bearing, (2) having an inner wall enclosing said bearing and surrounding said pumping mechanism with a defined clearance to form therebetween a defined pumping chamber having a discharge outlet, (3) sealingly receiving said rotating shaft, and (4) for containing a predetermined volume of liquid lubricant;

said pumping mechanism, when rotating, discharging a volume of liquid lubricant from said pumping chamber, and the entire discharged volume of liquid lubricant flowing through said discharge outlet, said return channel, said inlet side of said bearing, said bearing, said outlet side of said bearing, and returning back to said pumping chamber, thereby controllably maintaining continuous liquid lubricant flow through said bearing; and said defined clearance being such that said discharged liquid lubricant from said pumping mechanism being at a relatively higher pressure compared to the atmospheric pressure of said liquid lubricant at said inlet side of said bearing.

12. An apparatus for supporting a rotating shaft according to claim 11, wherein said bearing and said pumping chamber contain a predetermined volume of liquid lubricant when said shaft is not rotating.

13. An apparatus for supporting a rotating shaft according to claim 12, and further including:

a filter element in said body for filtering said discharged liquid lubricant prior to returning it to said inlet side of said bearing; and said pumping mechanism has at least two diametrically-opposed radial vanes, and each consecutive pair of vanes defining a pocket therebetween for accepting lubricant therein.

14. An apparatus for supporting a rotating shaft, comprising:

a bearing for supporting said rotating shaft, said bearing having an inlet side and an outlet side;

a rotary liquid pumping mechanism (1) being generally circular in form, (2) having an overall diameter corresponding substantially to the outside diameter of said bearing, and (3) being concentrically mounted on said shaft adjacent to said outlet side of said bearing for rotation with said shaft;

a casing having a body (1) defining a return flow channel externally of said bearing, (2) having an inner wall enclosing said bearing and surrounding said pumping mechanism with a defined clearance to form therebetween a defined pumping chamber having a discharge outlet, (3) sealingly receiving said rotating shaft, and (4) for containing a predetermined volume of liquid lubricant; and said pumping mechanism, when rotating, discharging a volume of liquid lubricant flowing from said pumping chamber, through said discharge outlet, said return channel, said inlet side of said bearing, said bearing, said outlet side of said bearing, and returning back to said pumping chamber, thereby controllably maintaining continuous liquid lubricant flow through said bearing.

15. An apparatus for supporting a rotating shaft, comprising:

a bearing having an inner race, an outer race, and bearing elements between said races for supporting said rotating shaft, said bearing having an inlet side and an outlet side, and said bearing elements defining therebetween axial inlet flow passage;

a rotary liquid pumping mechanism concentrically mounted on said shaft adjacent to said outlet side of said bearing for rotation with said shaft;

a casing having a body (1) defining a return flow channel externally of said bearing, (2) having an inner wall enclosing said bearing and surrounding said pumping mechanism with a defined clearance to form therebetween a defined pumping chamber having a at least one expanding eccentric cavity gradually tapering outwardly over an arcuate extent and having a discharge outlet, (3) sealingly receiving said rotating shaft, and (4) for containing a predetermined volume of liquid lubricant;

said pumping mechanism having an outer peripheral wall in defined spaced relation to said eccentric cavity so as to compress liquid lubricant entering therein: and said pumping mechanism, when rotating, discharging a volume of liquid lubricant from said pumping chamber, and the entire discharged volume of liquid lubricant flowing through said discharge outlet, said return channel, said inlet side of said bearing, said bearing, said axial inlet passages, said outlet side of said bearing, and returning back to said pumping chamber, thereby controllably maintaining continuous liquid lubricant flow through said bearing.

16. An apparatus for supporting a rotating shaft, comprising:

a bearing for supporting said rotating shaft, said bearing having an inlet side and an outlet side;

a rotary liquid pumping mechanism substantially circular in form and having an overall diameter corresponding substantially to the outside diameter of said bearing, and said pumping mechanism being concentrically mounted on said shaft adjacent to said outlet side of said bearing for rotation with said shaft;

a casing having a body (1) defining a return flow channel externally of said bearing, (2) having an inner wall enclosing said bearing and surrounding said pumping mechanism with a defined clearance to form therebetween a defined pumping chamber having a discharge outlet, (3) sealingly receiving said rotating shaft, and (4) for containing a predetermined volume of liquid lubricant; and said pumping mechanism, when rotating, discharging a volume of liquid lubricant from said pumping chamber, and the entire discharged volume of liquid lubricant flowing through said discharge outlet, said return channel, said inlet side of said bearing, said bearing, said outlet side of said bearing, and returning back to said pumping chamber, thereby controllably maintaining continuous liquid lubricant flow through said bearing.

17. An apparatus for supporting a rotating shaft according to claim 16, wherein said casing has a pair of axially-opposed openings defining a bore therebetween;

a pair of end seals sealing off the opposite ends of said bore from the ambient; and said pumping mechanism has at least two diametrically-opposed radial vanes, and each consecutive pair of vanes defining a pocket therebetween for accepting lubricant therein.

18. An apparatus for supporting a rotating shaft according to claim 16, and further including:

a filter element in said body for filtering said discharged liquid lubricant prior to returning it to said inlet side of said bearing.

* * * * *